(12) United States Patent
Xiong et al.

(10) Patent No.: US 12,028,859 B2
(45) Date of Patent: Jul. 2, 2024

(54) UE CONFIGURED FOR PUSCH REPETITION BASED ON TPMI INDEX AND SRI

(71) Applicant: Intel Corporation, Santa Clara, CA (US)

(72) Inventors: Gang Xiong, Beaverton, OR (US); Sergey Sosnin, Zavolzhie (RU); Jie Zhu, San Jose, CA (US); Gregory Ermolaev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 17/314,200

(22) Filed: May 7, 2021

(65) Prior Publication Data

US 2021/0337534 A1 Oct. 28, 2021

Related U.S. Application Data

(60) Provisional application No. 63/024,091, filed on May 13, 2020.

(51) Int. Cl.
*H04L 5/00* (2006.01)
*H04B 7/06* (2006.01)
(Continued)

(52) U.S. Cl.
CPC .......... *H04W 72/21* (2023.01); *H04B 7/0639* (2013.01); *H04L 1/1887* (2013.01); *H04W 72/1268* (2013.01); *H04W 72/23* (2023.01)

(58) Field of Classification Search
None
See application file for complete search history.

(56) References Cited

U.S. PATENT DOCUMENTS 11,115,242 B2 * 9/2021 Akkarakaran ........ H04L 5/0023
11,317,396 B2 * 4/2022 Khoshnevisan .......... H04L 1/08
(Continued)

OTHER PUBLICATIONS

"3GPP TS 38.211 V16.2.0", 3rd Generation Partnership Project; Technical Specification Group Radio Access Network;NR;Physical channels and modulation(Release 16), (Jun. 2020), 131 pgs.
(Continued)

*Primary Examiner* — Sithu Ko
(74) *Attorney, Agent, or Firm* — Schwegman Lundberg & Woessner, P.A.

(57) ABSTRACT

A user equipment (UE) configured for physical uplink shared channel (PUSCH) repetition in an fifth-generation (5G) new radio (NR) network decodes a downlink control information (DCI) format that includes a scheduling grant for a PUSCH transmission. For a codebook-based PUSCH transmission, the DCI format indicates at least a first and a second transmit precoder matrix indicator (TPMI) index for PUSCH repetition. The UE may apply a precoder matrix determined from the first TPMI index to encode a PUSCH for a first PUSCH transmission occasion of the PUSCH repetition and may apply a precoder matrix determined from the second TPMI index to encode the PUSCH for a second PUSCH transmission occasion. For a non-codebook-based PUSCH transmission, the DCI format indicates at least a first and a second sounding reference signal (SRS) resource indicator (SRI) for PUSCH repetition. The UE may apply the first SRI to encode the PUSCH for the first PUSCH transmission occasion and may apply the second SRI to encode the PUSCH for the second PUSCH transmission occasion.

16 Claims, 7 Drawing Sheets

(51) Int. Cl.
*H04L 1/1867* (2023.01)
*H04W 72/1268* (2023.01)
*H04W 72/21* (2023.01)
*H04W 72/23* (2023.01)

(56) References Cited

U.S. PATENT DOCUMENTS

| | | | | |
|---|---|---|---|---|
| 11,588,523 | B2* | 2/2023 | Khoshnevisan | H04L 5/0091 |
| 2021/0044385 | A1* | 2/2021 | Hosseini | H04L 5/0051 |
| 2021/0184812 | A1* | 6/2021 | MolavianJazi | H04L 1/0041 |
| 2021/0367730 | A1* | 11/2021 | Chen | H04L 5/0048 |
| 2022/0353827 | A1* | 11/2022 | Okamura | H04B 7/0456 |
| 2022/0400471 | A1* | 12/2022 | Hu | H04L 5/0048 |
| 2023/0076139 | A1* | 3/2023 | Muruganathan | H04L 5/0048 |
| 2023/0141329 | A1* | 5/2023 | Ling | H04L 5/0051 |
| | | | | 455/522 |

OTHER PUBLICATIONS

"3GPP TS 38.212 V16.2.0", 3rd Generation Partnership Project; Technical Specification Group Radio Access Network;NR;Multiplexing and channel coding(Release 16), (Jun. 2020), 151 pgs.

* cited by examiner

US 12,028,859 B2

UE CONFIGURED FOR PUSCH REPETITION BASED ON TPMI INDEX AND SRI

PRIORITY CLAIM

This application claims the benefit of priority under 35 U.S.C. 119(e) to U.S. Provisional Patent Application Ser. No. 63/024,091, filed May 13, 2020 which is incorporated herein by reference in its entirety.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks.

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth. One issue with 5G-NR networks is coverage performance and the ability of the generation node B (gNB) to receive a data channel, such as the physical uplink shared channel (PUSCH) from a UE

DETAILED DESCRIPTION

Figure 1A:
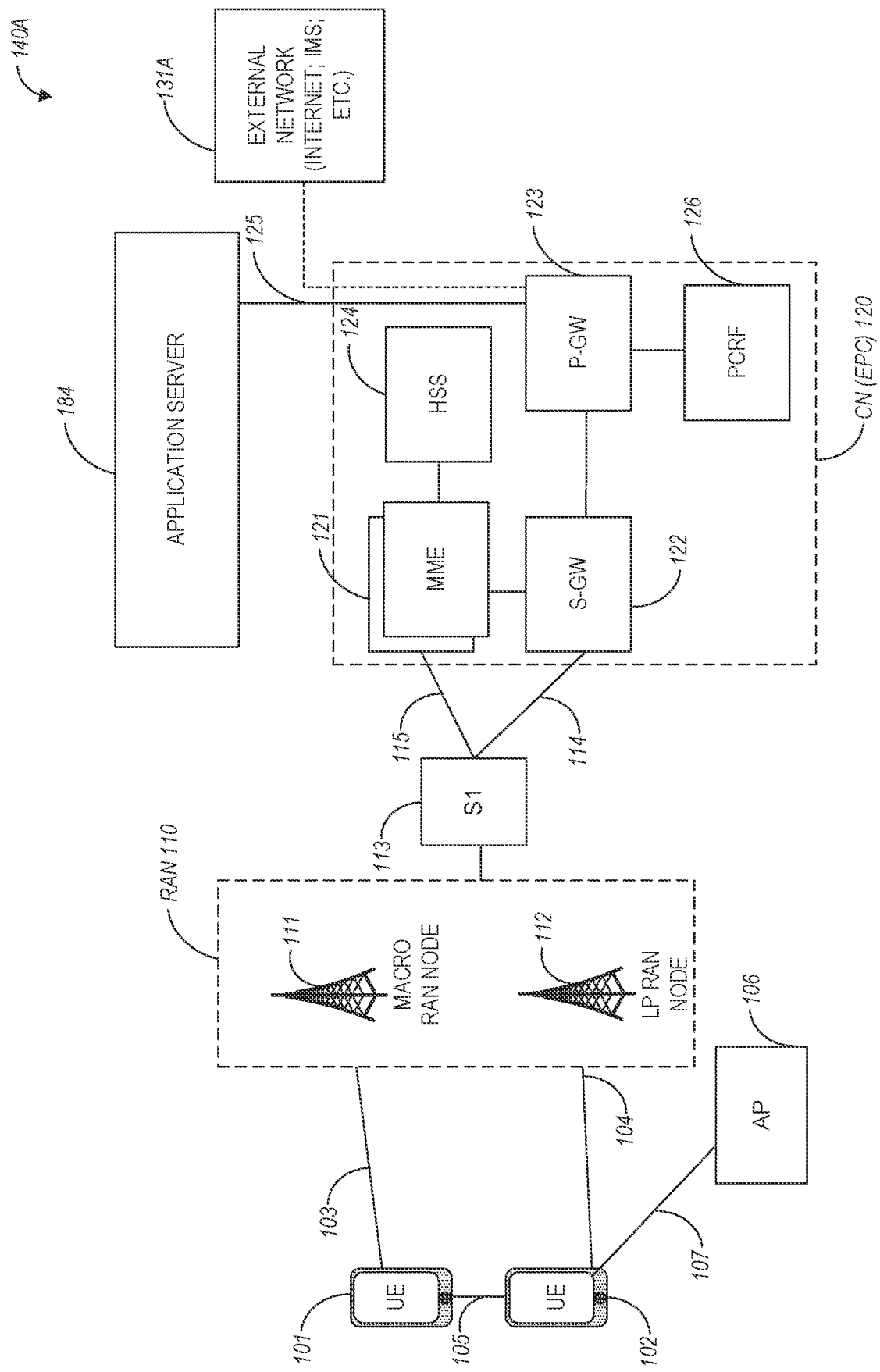
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein are directed to a user equipment (UE) configured for physical uplink shared channel (PUSCH) repetition in an fifth-generation (5G) new radio (NR) network. In these embodiments, the UE may be configured to decode a downlink control information (DCI) format received from a generation node B (gNB), the DCI format including a scheduling grant for a PUSCH transmission.

For a codebook-based PUSCH transmission, the DCI format indicates at least a first and a second transmit precoder matrix indicator (TPMI) index for PUSCH repetition. The UE may apply a precoder matrix determined from the first TPMI index to encode a PUSCH for a first PUSCH transmission occasion of the PUSCH repetition and may apply a precoder matrix determined from the second TPMI index to encode the PUSCH for a second PUSCH transmission occasion of the PUSCH repetition.

For a non-codebook-based PUSCH transmission, the DCI format indicates at least a first and a second sounding reference signal (SRS) resource indicator (SRI) for PUSCH repetition. Each SRI may correspond to an SRS resource set. In these embodiments, the UE may apply the first SRI to encode the PUSCH for the first PUSCH transmission occasion of the PUSCH repetition and may apply the second SRI to encode the PUSCH for the second PUSCH transmission occasion of the PUSCH repetition. In these embodiments, for non-codebook-based PUSCH transmission, the first and second SRIs may be used either to determine precoder matrices for the first and second PUSCH transmission occasions or to determine transmit beam directions for the first and second PUSCH transmission occasions. These embodiments are discussed in more detail below.

In some embodiments, the DCI format may comprise DCI format 0_1 or DCI format 0_2.

In some embodiments, for a codebook-based PUSCH transmission, the DCI format may include a first TPMI field and a second TPMI field. The first TPMI field may include the first TPMI index and a number of MIMO transmission layers and the second TPMI field may include the second TPMI index. In these embodiments, the UE may encode the PUSCH in accordance with the number of layers for both the first and the second PUSCH transmission occasion of the PUSCH repetition. In these embodiments, the second TPMI field may not necessarily need to include a number of layers since the same number of transmission layers may be applied as indicated in the first TPMI field.

In some embodiments, for a non-codebook-based PUSCH transmission the DCI format may include two SRI fields corresponding to one or two SRS resource sets to employ SRI cycling for a non-codebook-based PUSCH transmission with repetition. In these non-codebook-based PUSCH transmission embodiments, sounding reference signal (SRS)

resource indicator (SRI) cycling is employed for the transmission of a PUSCH with repetition.

In some embodiments, for a non-codebook-based PUSCH transmission, each SRI may be indicated for a different transmission reception point (TRP) of the gNB. In these embodiments, each PUSCH transmission occasion of the PUSCH repetition may be encoded for transmission as indicated by the SRI.

In some embodiments, for a non-codebook-based PUSCH transmission, a precoder matrix determined from the first SRI may be applied to the first PUSCH transmission occasion and a precoder matrix determined from the second SRI may be applied to the second PUSCH transmission occasion. In these embodiments, the precoder matrix determined from the first SRI and the precoder matrix determined from the second SRI may be based on a precoder matrix used for a prior SRS transmission in each precoder beam by the UE. In some embodiments, the precoder matrix from the first SRI that is applied by the UE to the first PUSCH transmission occasion and the precoder matrix from the second SRI that is applied by the UE to the second PUSCH transmission occasion are reduced precoder matrices.

In some embodiments, for a non-codebook-based PUSCH transmission, the UE may determine a first transmit beam direction from the first SRI to apply to the first PUSCH transmission occasion of the PUSCH repetition, and determine a second transmit beam direction from the second SRI to apply to the second PUSCH transmission occasion of the PUSCH repetition. In these embodiments, instead of determining a precoder matrix from the first SRI and determining a precoder matrix from the second SRI, transmit beam directions are determined for transmission of the first and second PUSCH transmissions occasions of the PUSCH repetition allowing a different beam direction to be use for each transmission occasion.

In some embodiments, for a codebook-based PUSCH transmission, the UE may decode the first TPMI index to determine the number of transmission layers for all PUSCH occasions of the PUSCH repetition. In these embodiments, the same number of transmission layers may be applied for each PUSCH occasions of the PUSCH repetition.

In some embodiments, the UE may encode each PUSCH transmission occasion of the PUSCH repetition for a multi-layer transmission in accordance with the number of transmission layers using multiple antenna ports.

In some embodiments, for a codebook-based PUSCH transmission, the first TPMI index may be indicated by a value of '0' and may be used for a first PUSCH repetition and the second TPMI index may be indicated by a value of '1' and may be used for a second PUSCH repetition. In these embodiments, each TPMI index may correspond to a different precoder matrix allowing different precoding matrixes to applied for different transmission occasions of a PUSCH repetition.

In some embodiments, for both a codebook-based PUSCH transmission and a non-codebook-based PUSCH transmission, each PUSCH transmission occasion of the PUSCH repetition may be configured to occur in different time slots. (i.e., (at different times) to help improve coverage performance and increase the ability of the gNB to receive the PUSCH from the UE.

Some embodiments are directed to a non-transitory computer-readable storage medium that stores instructions for execution by processing circuitry a user equipment (UE) configured for physical uplink shared channel (PUSCH) repetition in an fifth-generation (5G) new radio (NR) network. In these embodiments, the processing circuitry may decode a downlink control information (DCI) format received from a generation node B (gNB), the DCI format including a scheduling grant for a PUSCH transmission. In these embodiments, for a codebook-based PUSCH transmission, the DCI format indicates at least a first and a second transmit precoder matrix indicator (TPMI) index for PUSCH repetition. In these embodiments, the processing circuitry may apply a precoder matrix determined from the first TPMI index to encode a PUSCH for a first PUSCH transmission occasion of the PUSCH repetition, and apply a precoder matrix determined from the second TPMI index to encode the PUSCH for a second PUSCH transmission occasion of the PUSCH repetition. In these embodiments, for a non-codebook-based PUSCH transmission, the DCI format may indicate at least a first and a second sounding reference signal (SRS) resource indicator (SRI) for PUSCH repetition, Each SRI may correspond to an SRS resource set. In these embodiments, the processing circuitry may be configured to apply the first SRI to encode the PUSCH for the first PUSCH transmission occasion of the PUSCH repetition and apply the second SRI to encode the PUSCH for the second PUSCH transmission occasion of the PUSCH repetition.

Some embodiments are directed to a generation node B (gNB) configured for operation in an fifth-generation (5G) new radio (NR) network. In these embodiments, the gNB may encode a downlink control information (DCI) format for transmission to a user equipment (UE). The DCI format may include a scheduling grant for a physical uplink shared channel (PUSCH) transmission. In these embodiments, for a codebook-based PUSCH transmission by the UE, the DCI format may be encoded to indicate at least a first and a second transmit precoder matrix indicator (TPMI) index for PUSCH repetition. In these embodiments, for a non-codebook-based PUSCH transmission by the UE, the DCI format may be encoded indicate at least a first and a second sounding reference signal (SRS) resource indicator (SRI) for PUSCH repetition. In these embodiments, each SRI may correspond to an SRS resource set.

In these embodiments, for a codebook-based PUSCH transmission by the UE, the gNB may apply a precoder matrix for the first TPMI index to decode a PUSCH for a first PUSCH transmission occasion of the PUSCH repetition and may apply a precoder matrix for the second TPMI index to decode the PUSCH for a second PUSCH transmission occasion of the PUSCH repetition. For a non-codebook-based PUSCH transmission by the UE, the gNB may apply a precoder matrix or a first beam direction based on the first SRI to decode the PUSCH for the first PUSCH transmission occasion of the PUSCH repetition and may apply a precoder matrix or a second beam direction based on the second SRI to decode the PUSCH for the second PUSCH transmission occasion of the PUSCH repetition.

These embodiments are described in more detail below.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
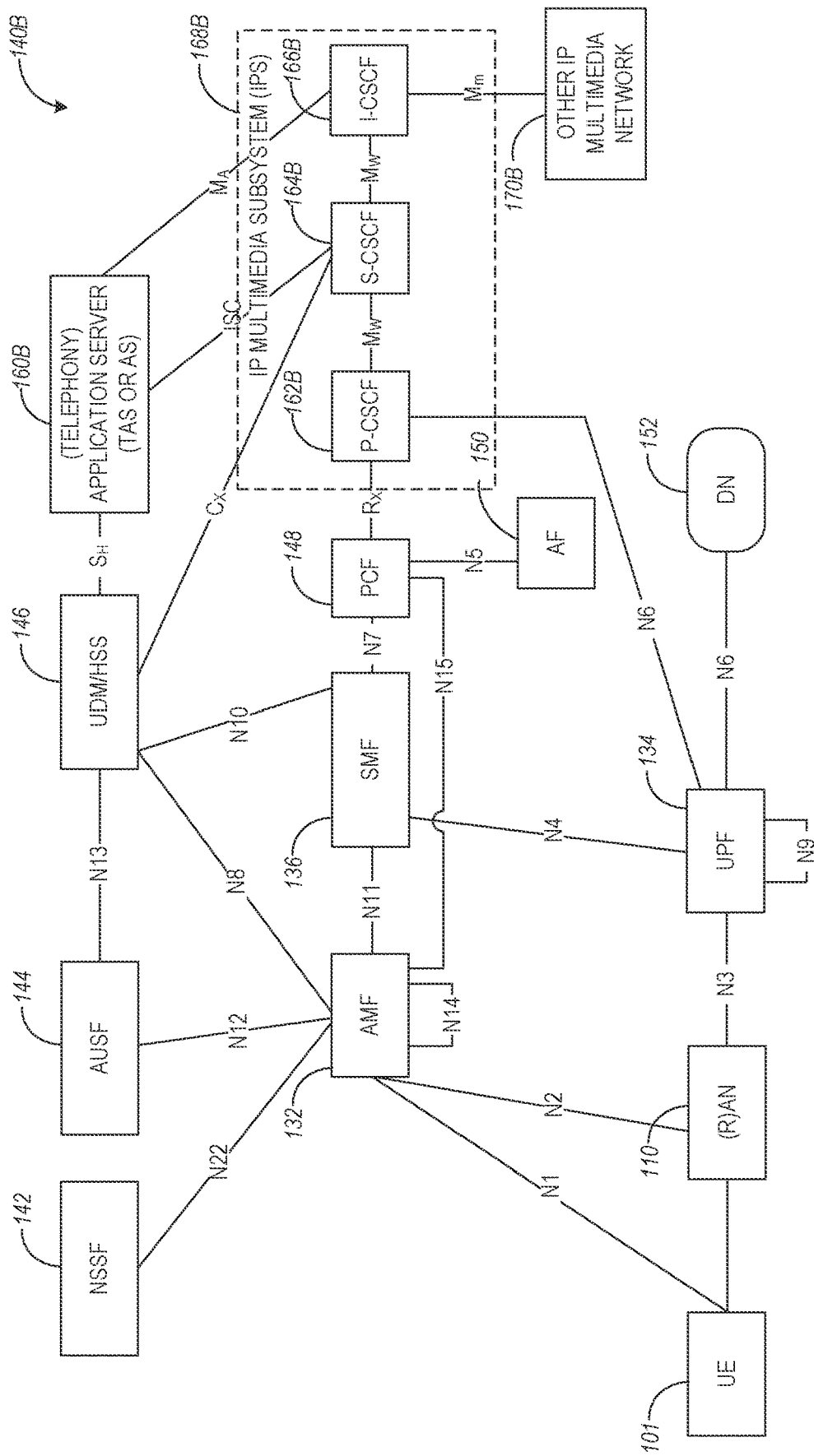
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
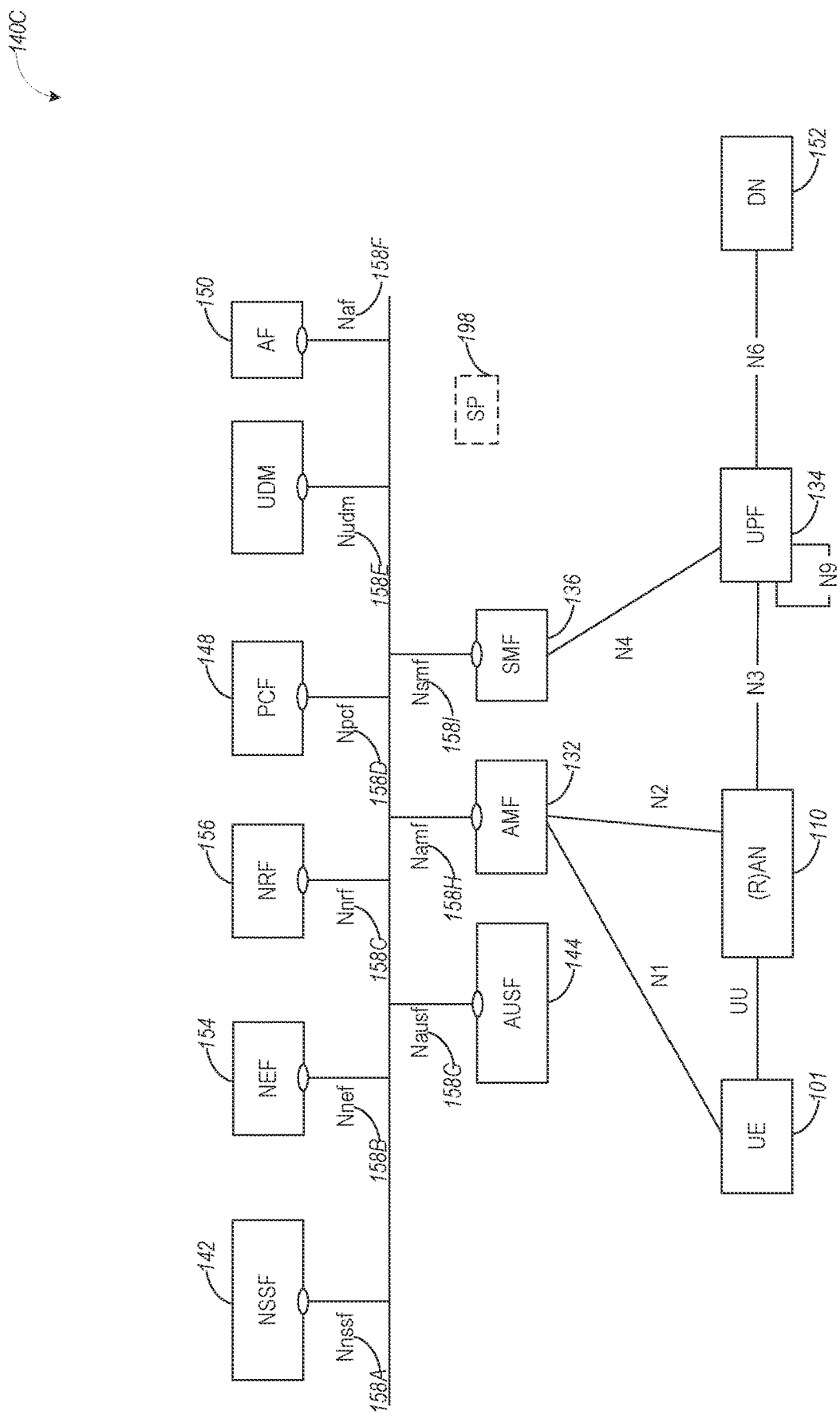

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

For a cellular system, coverage is an important factor for successful operation. Compared to LTE, NR can be deployed at relatively higher carrier frequency in frequency range 1 (FR1), e.g., at 3.5 GHz. In this case, coverage loss is expected due to larger path-loss, which makes it more challenging to maintain an adequate quality of service. Typically, uplink coverage is the bottleneck for system operation considering the low transmit power at UE side.

For NR, dynamic grant and configured grant based physical uplink shared channel (PUSCH) transmission are supported. For dynamic grant PUSCH transmission, PUSCH is scheduled by DCI format 0_0, 0_1 or 0_2. Further, two types of configured grant PUSCH transmission are specified. In particular, for Type 1 configured grant PUSCH transmission, UL data transmission is only based on radio resource control (RRC) (re)configuration without any layer 1 (L1) signalling. In particular, semi-static resource may be configured for one UE, which includes time and frequency resource, modulation and coding scheme, reference signal, etc. For Type 2 configured grant PUSCH transmission, UL data transmission is based on both RRC configuration and L1 signaling to activate/deactivate UL data transmission.

For PUSCH transmission, non-codebook and codebook-based transmission can be employed. More specifically, for non-codebook based PUSCH transmission, precoding matrix is an identity matrix. Further, initial precoding information is based on the measurement from UE and reported by UE. Subsequently, gNB may select a subset of sounding reference signal (SRS) resource indicator (SRI) in the DCI for scheduling grant.

For codebook based PUSCH transmission, the codebook information including transmit precoder matrix indicator (TPMI) is indicated by gNB in the DCI for scheduling grant. In particular, the precoding matrix is determined according to the number of layers and the number of antenna ports used for the PUSCH transmission.

In NR Rel-15, a number of repetitions can be configured for the transmission of PUSCH to help improve the coverage performance. When repetition is employed for the transmission of PUCCH and PUSCH, same time domain resource allocation (TDRA) is used in each slot. Further, inter-slot frequency hopping can be configured to improve the performance by exploiting frequency diversity. In Rel-16, the number of repetitions for PUSCH can be dynamically indicated in the DCI.

Note that in Rel-15, same precoder is employed for the transmission of PUSCH with repetition. When UE is equipped with multiple transmit antennas, multiple port-based transmission in conjunction with precoder cycling may be employed for PUSCH to exploit the benefit of transmit diversity or spatial diversity, which can help further enhance the coverage performance. To support multiple port-based transmission with precoder cycling, certain mechanism may be considered for PUSCH transmission with repetition.

Various embodiments herein provide detailed mechanisms on improving coverage performance for uplink data transmission (e.g., NR PUSCH). For example, embodiments provide.

Precoding Cycling Indication and SRI Cycling Indication for PUSCH Repetition

Precoding cycling and SRI cycling pattern for PUSCH repetition

Multiple port-based transmission for PUSCH transmission

Note that in the disclosure, "repetition level", "number of repetitions", "number of slots", "multiple slots" and "aggregation factor" are exchangeable terms.

Precoding Cycling Indication and SRI Cycling Indication for PUSCH Repetition

As mentioned above, in Rel-15, same precoder is employed for the transmission of PUSCH with repetition. When UE is equipped with multiple transmit antennas, multiple port-based transmission in conjunction with precoder cycling may be employed for PUSCH to exploit the benefit of transmit diversity or spatial diversity, which can help further enhance the coverage performance. To support multiple port-based transmission with precoder cycling, certain mechanism may be considered for PUSCH transmission with repetition.

Embodiments of mechanism on precoding cycling for PUSCH coverage enhancement are provided as follows:

In one embodiment of the disclosure, for codebook based PUSCH transmission, different precoding matrixes may be applied for different parts of PUSCH repetitions. For instance, assuming two precoding matrixes for the transmission of PUSCH with repetitions, a first precoding matrix is applied for a first part of repetition and a second precoding matrix is applied for a second part of repetition and can be repeated during the repetitions.

In particular, the following text in 3GPP TS 38.211: "NR, Physical channels and modulation (Rel-16) can be updated to include the TPMI index $n_{TMPI}$:

The block of vectors $[y^{(0)}(i) \ldots y^{(v-1)}(i)]^T$, $i=0, 1, \ldots M_{symb}^{layer}-1$ shall be precoded according to $$\begin{bmatrix} z^{(p_0)}(i) \\ \ldots \\ z^{(p_{P-1})}(i) \end{bmatrix} = W(n_{TPMI}) \begin{bmatrix} y^{(0)}(i) \\ \ldots \\ y^{(v-1)}(i) \end{bmatrix}$$

where $i=0, 1, \ldots M_{symb}^{ap}-1$, $M_{symb}^{ap}=M_{symb}^{layer}$. The set of antenna ports $\{p_0, \ldots, p_{P-1}\}$ shall be determined according to the procedure in TS 38.214, is the TPMI index.

Note that in the above equation, n_TPMI is defined as the precoding matrix index for corresponding PUSCH transmission in each transmission occasion. Further, the precoding cycling pattern or the TPMI for each transmission occasion can be configured by higher layers via NR remaining minimum system information (RMSI), NR other system information (OSI) or dedicated radio resource control (RRC) signalling, or dynamically indicated in the DCI, or a combination thereof.

In another embodiment of the disclosure, a group or a set of TPMI indices can be configured by higher layers via RMSI (SIB1), OSI or RRC signalling or predefined in the specification. Further, the reserved states in the field "Precoding information and number of layers" for DCI format 0_1 or 0_2 can be reinterpreted as the TPMI index for precoding cycling for the PUSCH transmission with repetition.

In one example, the following text in Table 7.3.1.1.2-5 from 3GPP TS 38.212: "NR; Multiplexing and channel coding (Rel-16) can be updated as highlighted in underline:

TABLE 7.3.1.1.2-5

Precoding information and number of layers, for 2 antenna ports, if transform precoder is enabled, or if transform precoder is disabled and maxRank = 1

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| <u>6</u> | <u>1 layer: TPMI_SET_0</u> | | |
| <u>7</u> | <u>1 layer: TPMI_SET_1</u> | | |

In the table, TPMI_SET_0 and TPMI_SET_1 can be predefined in the specification, e.g., TPMI_SET_0=(0, 1) and TPMI_SET_1={2, 3}, which indicates that for TPMI_SET_0, a first TPMI index of 0 is used for a first part of PUSCH repetition while a second TPMI index of 1 is used for a second part of PUSCH repetition.

In another option, TPMI_SET_0 and TPMI_SET_1 can be configured by higher layers via RMSI (SIB1), OSI or RRC signalling.

In another embodiment of the disclosure, the field "Precoding information and number of layers" can be extended by 1 bit to include multiple sets of TPMI values. Similar to aforementioned option, multiple sets of TPMI values can be predefined in the specification or configured by higher layers via RMSI (SIB1), OSI or RRC signalling.

In one example, the following text in Table 7.3.1.1.2-5 from TS 38.212 can be updated as highlighted in underline:

TABLE 7.3.1.1.2-5

Precoding information and number of layers, for 2 antenna ports, if transform precoder is enabled, or if transform precoder is disabled and maxRank = 1

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | <u>2</u> | <u>1 layer: TPMI = {0, 1}</u> |
| 3 | 1 layer: TPMI = 3 | <u>3</u> | <u>reserved</u> |
| 4 | 1 layer: TPMI = 4 | | |
| 5 | 1 layer: TPMI = 5 | | |
| 6-7 | reserved | | |

Note that the above options can be straightforwardly extended to other tables in the DCI format 0_1 and/or 0_2 for the field "Precoding information and number of layers"

In another embodiment of the disclosure, similar to precoding cycling, sounding reference signal (SRS) resource indicator (SRI) cycling can be employed for the transmission of PUSCH with repetition.

In particular, a group or a set of TPMI values can be configured by higher layers via RMSI (SIB1), OSI or RRC signalling or predefined in the specification. Further, the reserved states in the field "SRS resource indicator" for DCI format 0_1 or 0_2 can be reinterpreted as the TPMI index for precoding cycling for the PUSCH transmission with repetition.

In one example, the following text in Table 7.3.1.1.2-28 from TS 38.212 can be updated as highlighted in underline:

TABLE 7.3.1.1.2-28

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
|   |   | 2 | 2 | 2 | 2 |
|   |   | 3 | SRI_SET | 3 | 3 |

In the table, SRI_SET can be predefined in the specification, e.g., SRI_SET={0, 1}, which indicates that for TPMI_SET_0, a first SRI of 0 is used for a first part of PUSCH repetition while a second SRI of 1 is used for a second part of PUSCH repetition.

In another option, SRI_SET can be configured by higher layers via RMSI (SIB1), OSI or RRC signalling.

In another embodiment of the disclosure, the field "SRS resource indicator" can be extended by 1 bit to include multiple sets of SRI values. Similar to aforementioned option, multiple sets of SRI values can be predefined in the specification or configured by higher layers via RMSI (SIB1), OSI or RRC signalling.

In one example, the following text in Table 7.3.1.1.2-5 from TS 38.212 can be updated as highlighted in underline:

TABLE 7.3.1.1.2-28

SRI indication for non-codebook based PUSCH transmission, $L_{max} = 1$

| Bit field mapped to index | SRI(s), $N_{SRS} = 2$ | Bit field mapped to index | SRI(s), $N_{SRS} = 3$ | Bit field mapped to index | SRI(s), $N_{SRS} = 4$ |
|---|---|---|---|---|---|
| 0 | 0 | 0 | 0 | 0 | 0 |
| 1 | 1 | 1 | 1 | 1 | 1 |
| <u>2</u> | <u>{0, 1}</u> | 2 | 2 | 2 | 2 |
| <u>3</u> | <u>reserved</u> | 3 | reserved | 3 | 3 |

Note that the same principle can be applied for other columns in the table above. Further, the above options can be straightforwardly extended to other tables in the DCI format 0_1 and/or 0_2 for the field "SRS resource indicator".

Precoding Cycling and SRI Cycling Pattern for PUSCH Repetition

Embodiments of precoding cycling and SRI cycling pattern for PUSCH repetition are provided as follows:

In one embodiment of the disclosure, precoding cycling and/or SRI cycling pattern for PUSCH repetition may follow an interleaved pattern. In particular, a first TPMI and/or SRI is applied for the first PUSCH transmission occasion or the first slot within the repetition, and a second TPMI and/or SRI is applied for the first PUSCH transmission occasion or the first slot within the repetition. Further, the precoding cycling and/or SRI cycling pattern is repeated across the PUSCH transmission with repetition.

In another embodiment of the disclosure, the precoding cycling and/or SRI cycling pattern may be defined such that the first TPMI and/or SRI is applied for the first N PUSCH transmission occasions or the first N slot within the repetition, and a second TPMI and/or SRI is applied for the first N PUSCH transmission occasions or the first N slots within the repetition. Further, the precoding cycling and/or SRI cycling pattern is repeated across the PUSCH transmission with repetition. Note that N can be predefined in the specification, e.g., N=2, or 4, or configured by higher layer via RMSI (SIB1), OSI or RRC signalling or dynamically indicated in the DCI or a combination thereof.

As a further extension, N may be determined in accordance with the number of repetitions for the transmission of PUSCH. In particular, $$N = \left\lfloor \frac{K_{Rep}}{2} \right\rfloor \text{ or } N = \left\lceil \frac{K_{Rep}}{2} \right\rceil$$

Where $K_{Rep}$ is the number of repetitions or slots for PUSCH transmission. In this case, the precoding cycling and/or SRI cycling pattern may be defined such that the first TPMI and/or SRI is applied for the first half of the repetition and the second TPMI and/or SRI is applied for the remaining $K_{Rep}-N$ slots of the repetition for PUSCH transmission.

In another embodiment of the disclosure, precoding cycling and/or SRI cycling pattern may be defined such that the number of uplink transmission occasions or slots for one TPMI and/or SRI can be aligned with the number uplink transmission occasions or slots where same frequency resource is allocated for uplink transmission with repetition.

For instance, in case of frequency hopping, UE may perform frequency hopping every D slots or transmission occasions. For this option, precoding cycling and/or SRI cycling may align with the frequency hopping pattern, such that UE may switch one precoder or SRI for PUSCH transmission every D slots or transmission occasions, where D may be predefined in the specification or RMSI (SIB1), OSI or RRC signalling or dynamically indicated in the DCI or a combination thereof.

Figure 2:
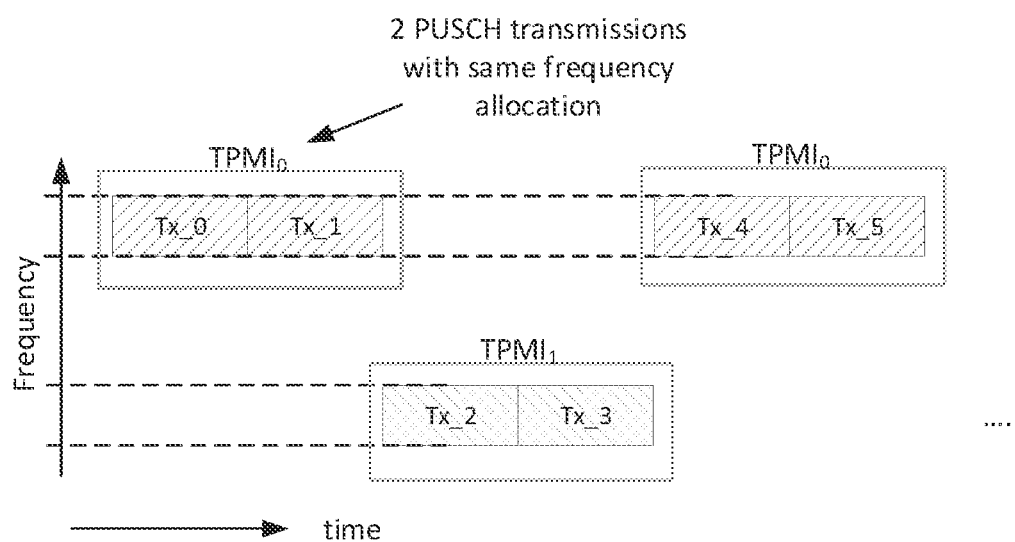
FIG. 2 illustrates one example of precoding cycling pattern for PUSCH repetition, in accordance with some embodiments.

FIG. 2 illustrates one example of precoding cycling pattern for PUSCH repetition. In the example, the TPMI cycling pattern is aligned with frequency hopping pattern. Note that Tx_i indicates ith PUSCH repetition in the figure. Further, same $TPMI_0$ is used for the first two PUSCH transmissions, and after PUSCH transmission is switched to another frequency resource, same $TPM_1$ is used for the next two PUSCH transmissions.

In another embodiment of the disclosure, the TPMI index and/or SRI index for each PUSCH transmission during repetition is defined as a function of one or more following parameters: slot index or PUSCH transmission occasion, number of repetitions for PUSCH transmission, number of PUSCH transmission in same frequency allocation, or D slot as mentioned above, total number of available values of TPMI index and/or SRI index.

In one option, the TPMI index can be defined as $n_{TPMI} = \mod(n_s^\mu, N_{TPMI})$ Where $n_s^\mu$ is the slot index, $N_{TPMI}$ is total number of TPMI values for PUSCH transmission with repetitions, where the set of TPMI values can be predefined in the specification or configured by higher layers or dynamically indicated in the DCI or a combination thereof as mentioned above. Note that in the equation, $n_s^\mu$ can be replaced by PUSCH transmission occasion.

In another option, the TPMI index can be defined as $$n_{TPMI} = \mod\left(\left\lfloor \frac{n_s^\mu}{D} \right\rfloor, N_{TPMI}\right)$$

where D is the number of PUSCH transmissions with same frequency allocation within repetition. Similarly, in the equation, $n_s^\mu$ can be replaced by PUSCH transmission occasion.

Note that above options can be straightforwardly applied for determination of SRI index.

Multiple Port-Based Transmission for PUSCH Transmission

Figure 3:
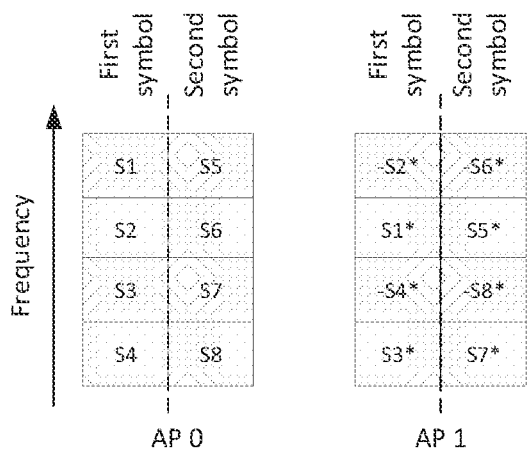
FIG. 3 illustrates the design principle for SFBC schemes for the transmission of PUSCH with two antenna ports (APs), in accordance with some embodiments.
Figure 4:
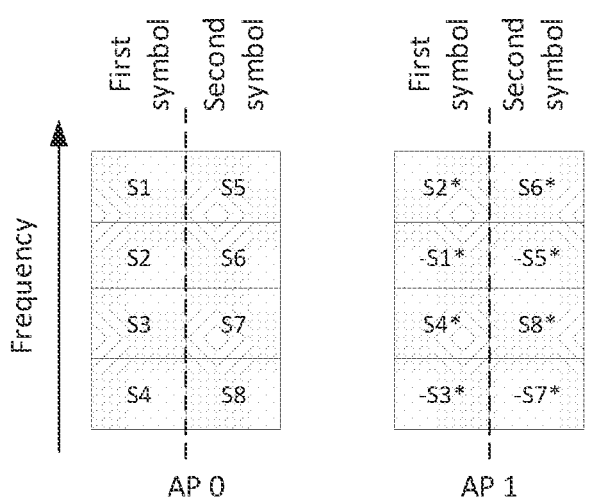
FIG. 4 illustrates the design principle for STBC schemes for the transmission of PUSCH with 2 APs, in accordance with some embodiments.

Embodiments of multiple port-based transmission for PUSCH transmission are provided as follows:

In one embodiment of the disclosure, transmit diversity can be applied for the transmission of PUSCH. In particular, space-frequency block code (SFBC) or space-time block code (STBC) based transmission scheme can be used for PUSCH transmission with repetition. FIG. 3 illustrates the design principle for SFBC schemes for the transmission of PUSCH with 2 APs. FIG. 4 illustrates the design principle for STBC schemes for the transmission of PUSCH with 2 APs.

Note that SFBC scheme can be used for each symbol separately and can be applied for the case of single symbol PUSCH transmission, 2 symbols transmission with and without intra-slot frequency hopping. STBC scheme can be applied for two consecutive symbols and can be used for the case of 2 PUSCH symbol transmission when intra-slot frequency hopping is disabled.

Further, the mapping matrix for the STBC and SFBC for PUSCH transmission with 2 APs can be determined as $$\begin{bmatrix} S_1 & -S_2^* \\ S_2 & S_1^* \end{bmatrix}$$

Note that a different mapping matrix can also be employed for the STBC and SFBC for PUSCH transmission with 2 APs as follows:

$$\begin{bmatrix} S_1 & S_2 \\ -S_2^* & S_1^* \end{bmatrix},$$

$$\begin{bmatrix} S_1^* & S_2 \\ -S_2^* & S_1 \end{bmatrix},$$

$$\begin{bmatrix} S_1^* & -S_2^* \\ S_2 & S_1 \end{bmatrix}.$$

In another embodiment of the disclosure, multiple port transmission can be applied for PUSCH transmission, in particular, PUSCH transmission on each AP can be mapped onto different frequency resources for different APs.

Note that PUSCH transmission on different APs can be mapped to different frequency resources, e.g., different physical resource blocks (PRB). For each AP, PUSCH transmission is mapped to consecutive PRBs. The distance between starting PRB of PUSCH transmission in frequency for two APs can be predefined in the specification or configured by higher layers via dedicated radio resource control (RRC) signalling. Note that for each AP, same number of PRBs for PUSCH transmission can be configured as a common parameter for each AP.

Alternatively, the starting PRB for PUSCH transmission for each AP can be configured via dedicated RRC signalling. Similar as the above option, the number of PRBs for PUSCH transmission for each AP can be configured as a common parameter.

Yet in another option, the starting PRB for PUSCH transmission for different APs can be determined in accordance with initial or active UL bandwidth part (BWP) BW. In one example, the distance between starting PRB of PUSCH transmission for two APs can be $$\left\lfloor \frac{N_{PRB}^{BWP}}{2} \right\rfloor,$$

where $N_{PRB}^{BWP}$ is the number of PRBs in the initial or active UL BWP.

As another example, depending on the size of active UL BWP, when the size of the active BWP is less than 50 PRBs, one of two higher layer configured offsets is indicated in the UL grant. Further, when the size of the active BWP is equal to or greater than 50 PRBs, one of four higher layer configured offsets is indicated in the UL grant. As a further extension, frequency offset indication field in case of frequency hopping can be reused for the frequency offset between two APs.

Note that when intra-slot frequency hopping is applied for the transmission of PUSCH, the above options can be applied for the first and second hop, respectively.

Figure 5:
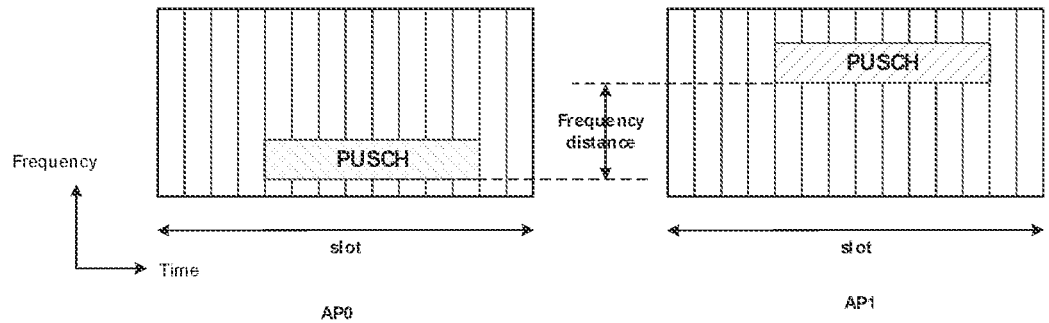
FIG. 5 illustrates one example of mapping PUSCH transmission in different frequency resources for two APs, in accordance with some embodiments.

FIG. 5 illustrates one example of mapping PUSCH transmission in different frequency resources for two APs. In the example, the distance between the starting PRB index of PUSCH transmission for two APs is half of the BWP BW.

In another embodiment of the disclosure, interleaved PUSCH transmission for different APs can be employed. More specifically, PUSCH transmission for different APs are mapped to different subcarriers, or physical resource blocks (PRB) in an interleaved manner. For instance, interleaved PUSCH transmission may be designed on PRB level. For this option, DMRS can be mapped on the same resource as the PUSCH transmission for each AP.

Figure 6:
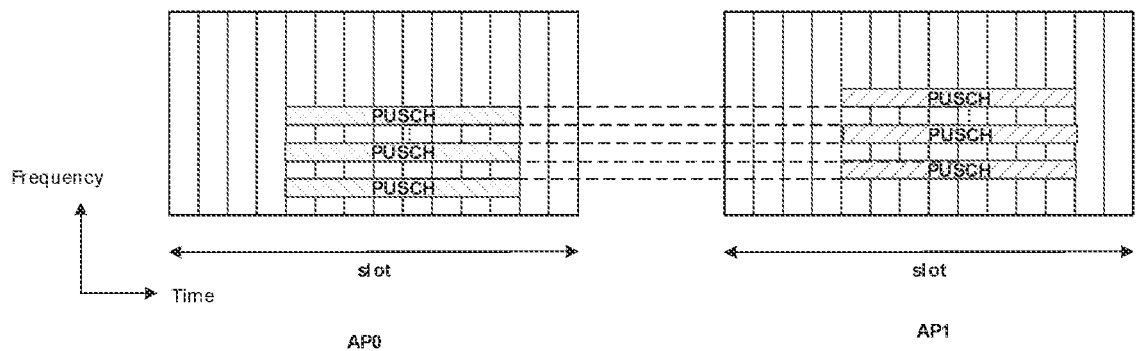
FIG. 6 illustrates one example of interleaved PUSCH transmission on two APs, in accordance with some embodiments.

FIG. 6 illustrates one example of interleaved PUSCH transmission on two APs. In the figure, PUSCH transmission on two APs are mapped to different PRBs in an interleaved manner.

Note that the above embodiments can be straightforwardly extended to the case when different time resources are configured for PUSCH transmission with different APs. In one example, the time domain resources for two APs are consecutive in a slot for the transmission of PUSCH. In another example, interleaved transmission in time is used for the PUSCH transmission with two APs. In particular, PUSCH for two APs is transmitted in different symbols in an interleaved manner.

Note that the above embodiments for multiple-port transmission and transmit diversity can apply for the PUSCH transmission with or without repetition.

Figure 7:
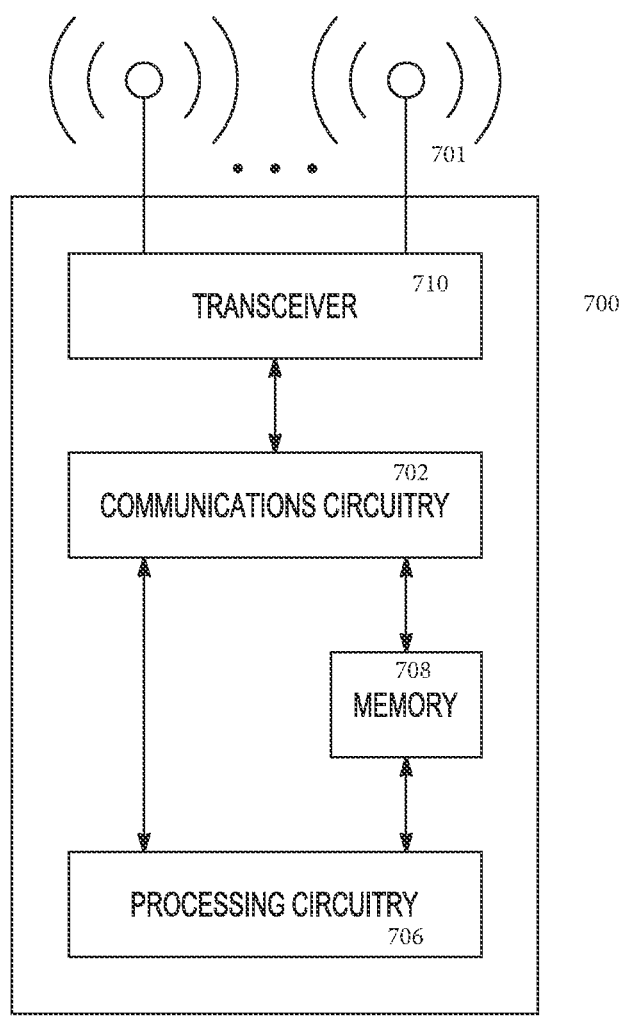
FIG. 7 illustrates a functional block diagram of a wireless communication device, in accordance with some embodiments.

FIG. 7 illustrates a function block diagram of a wireless communication device in accordance with some embodiments. The communication device 700 may be suitable for use as a UE or other handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device. The communication device 700 may be suitable for use as a node B, such as a gNB.

The communication device 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication device 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication device 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 700 may include one or more of a keyboard, a display, a non-volatile memory port, multiple antennas, a graphics processor, an application processor, speakers, and other mobile device elements. The display may be an LCD screen including a touch screen.

Although the communication device 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 700 may refer to one or more processes operating on one or more processing elements.

EXAMPLES

Example 1 may include a method of wireless communication for a fifth generation (5G) or new radio (NR) system:
Indicated, by gNB, a set of transmit precoder matrix indicator (TPMI) indexes or sounding reference signal (SRS) resource indicator (SRI) indexes;
Applied, by UE, a first TPMI index or SRI index from the set of TPMI or SRI indexes for a first part of a physical uplink shared channel (PUSCH) repetition, and a second TPMI index or SRI index from the set of TPMI or SRI indexes for a second part of the PUSCH repetition.

Example 2 may include the method of example 1 or some other example herein, wherein the precoding cycling pattern or the TPMI for each transmission occasion can be configured by higher layers via NR remaining minimum system information (RMSI), NR other system information (OSI) or dedicated radio resource control (RRC) signalling, or dynamically indicated in the downlink control information (DCI), or a combination thereof.

Example 3 may include the method of example 1 or some other example herein, wherein a group or a set of TPMI indices can be configured by higher layers via RMSI (SIB1), OSI or RRC signalling or predefined in the specification. Further, the reserved states in the field "Precoding information and number of layers" for DCI format 0_1 or 0_2 can be reinterpreted as the TPMI index for precoding cycling for the PUSCH transmission with repetition.

Example 4 may include the method of example 1 or some other example herein, wherein the field "Precoding information and number of layers" can be extended by 1 bit to include multiple sets of TPMI values.

Example 5 may include the method of example 1 or some other example herein, wherein sounding reference signal (SRS) resource indicator (SRI) cycling can be employed for the transmission of PUSCH with repetition.

Example 6 may include the method of example 1 or some other example herein, wherein a group or a set of TPMI values can be configured by higher layers via RMSI (SIB1), OSI or RRC signalling or predefined in the specification; wherein the reserved states in the field "SRS resource indicator" for DCI format 0_1 or 0_2 can be reinterpreted as the TPMI index for precoding cycling for the PUSCH transmission with repetition.

Example 7 may include the method of example 1 or some other example herein, wherein the field "SRS resource indicator" can be extended by 1 bit to include multiple sets of SRI values.

Example 8 may include the method of example 1 or some other example herein, wherein precoding cycling and/or SRI cycling pattern for PUSCH repetition may follow an interleaved pattern.

Example 9 may include the method of example 1 or some other example herein, wherein the precoding cycling and/or SRI cycling pattern may be defined such that the first TPMI and/or SRI is applied for the first N PUSCH transmission occasions or the first N slot within the repetition, and a second TPMI and/or SRI is applied for the first N PUSCH transmission occasions or the first N slots within the repetition.

Example 10 may include the method of example 9 or some other example herein, wherein the precoding cycling and/or SRI cycling pattern is repeated across the PUSCH transmission with repetition; wherein N can be predefined in the specification, e.g., N=2, or 4, or configured by higher layer via RMSI (SIB1), OSI or RRC signalling or dynamically indicated in the DCI or a combination thereof.

Example 11 may include the method of example 1 or some other example herein, wherein precoding cycling and/or SRI cycling pattern may be defined such that the number of uplink transmission occasions or slots for one TPMI and/or SRI can be aligned with the number uplink transmission occasions or slots where same frequency resource is allocated for uplink transmission with repetition Example 12 may include the method of example 1 or some other example herein, wherein the TPMI index and/or SRI index for each PUSCH transmission during repetition is defined as a function of one or more following parameters: slot index or PUSCH transmission occasion, number of repetitions for PUSCH transmission, number of PUSCH transmission in same frequency allocation, or D slot as mentioned above, total number of available values of TPMI index and/or SRI index.

Example 13 may include the method of example 12 or some other example herein, wherein TPMI or SRI index can be defined as $n_{TPMI} = \mod(n_s^\mu, N_{TPMI})$ Where $n_s^\mu$ is the slot index, $N_{TPMI}$ is total number of TPMI values for PUSCH transmission with repetitions, where the set of TPMI values can be predefined in the specification or configured by higher layers or dynamically indicated in the DCI or a combination thereof.

Example 14 may include the method of example 12 or some other example herein, wherein TPMI or SRI index can be defined as $n_{TPMI} = \mod\left(\left\lfloor \frac{n_s^\mu}{D} \right\rfloor, N_{TPMI}\right)$ where D is the number of PUSCH transmissions with same frequency allocation within repetition.

Example 15 may include the method of example 1 or some other example herein, wherein transmit diversity can be applied for the transmission of PUSCH; wherein space-frequency block code (SFBC) or space-time block code (STBC) based transmission scheme can be used for PUSCH transmission with repetition.

Example 16 may include the method of example 1 or some other example herein, wherein multiple port transmission can be applied for PUSCH transmission; wherein PUSCH transmission on each antenna port (AP) can be mapped onto different frequency resources for different APs.

Example 17 may include the method of example 1 or some other example herein, wherein for each AP, PUSCH transmission is mapped to consecutive physical resource blocks (PRB); wherein the distance between starting PRB of PUSCH transmission in frequency for two APs can be predefined in the specification or configured by higher layers via dedicated radio resource control (RRC) signalling.

Example 18 may include the method of example 1 or some other example herein, wherein the starting PRB for PUSCH transmission for different APs can be determined in accordance with initial or active UL bandwidth part (BWP) BW.

Example 19 may include the method of example 1 or some other example herein, wherein interleaved PUSCH transmission for different APs can be employed; wherein PUSCH transmission for different APs are mapped to different subcarriers, or physical resource blocks (PRB) in an interleaved manner.

Example 20 may include a method comprising:
receiving, from a gNB, a set of transmit precoder matrix indicator (TPMI) indexes or sounding reference signal (SRS) resource indicator (SRI) indexes; and
applying a first TPMI index or SRI index from the respective set of TPMI indexes or SRI indexes for transmission of a first part of a physical uplink shared channel (PUSCH) repetition; and
applying a second TPMI index or SRI index from the respective set of TPMI or SRI indexes for transmission of a second part of the PUSCH repetition.

Example 21 may include the method of example 20 or some other example herein, wherein the first TPMI index or SRI index are determined according to a precoding cycling pattern.

Example 22 may include the method of example 21 or some other example herein, further comprising receiving configuration information to indicate the precoding cycling pattern, wherein the configuration information is received via NR remaining minimum system information (RMSI), NR other system information (OSI) or dedicated radio resource control (RRC) signalling.

Example 23 may include the method of example 22-23, further comprising receiving a DCI to indicate a first precoding cycling pattern to use from among a plurality of precoding cycling patterns.

Example 24 may include the method of example 20-23 or some other example herein, wherein the set of TPMI indices is received via RMSI (e.g., SIB1), OSI or RRC signalling or predefined in the specification.

Example 25 may include the method of example 20-24 or some other example herein, further comprising receiving a DCI with DCI format 0_1 or 0_2 with a field "Precoding information and number of layers" to indicate the first and/or second TPMI index.

Example 26 may include the method of example 25 or some other example herein, wherein the field "Precoding information and number of layers" indicates multiple sets of TPMI values for a precoding cycling pattern.

Example 27 may include the method of example 20-26 or some other example herein, wherein the PUSCH repetition is a first PUSCH repetition, and wherein the method further comprises using SRI cycling for transmission of PUSCH repetitions including the first PUSCH repetition.

Example 28 may include the method of example 20-27 or some other example herein, further comprising receiving a DCI with DCI format 0_1 or 0_2 with a field "SRS resource indicator" to indicate the first and/or second SRI index.

Example 29 may include the method of example 28 or some other example herein, wherein the field "SRS resource indicator" indicates multiple sets of TPMI values for a precoding cycling pattern.

Example 30 may include the method of example 20-29 or some other example herein, wherein a precoding cycling pattern and/or SRI cycling pattern for the PUSCH repetition follows an interleaved pattern.

Example 31 may include the method of example 20-30 or some other example herein, wherein the first TPMI and/or SRI is applied for the first N PUSCH transmission occasions or the first N slots within the repetition, and the second TPMI and/or SRI is applied for the second N PUSCH transmission occasions or the second N slots within the repetition.

Example 32 may include the method of example 31 or some other example herein, further comprising repeating the application of the first TPMI and/or SRI index and the second TPMI and/or SRI index across the PUSCH transmission with repetition.

Example 33 may include the method of example 32 or some other example herein, wherein N is a predefined value.

Example 34 may include the method of example 32 or some other example herein, further comprising receiving an indication of N.

Example 35 may include the method of example 34 or some other example herein, wherein the indication is received via RMSI (SIB1), OSI or RRC signalling, dynamically indicated in a DC, or a combination thereof.

Example 36 may include the method of example 32-35 or some other example herein, wherein N is 2 or 4.

Example 37 may include the method of example 20-36 or some other example herein, wherein the first TPMI and/or SRI and the second TPMI and/or SRI index are applied according to a precoding cycling and/or SRI cycling pattern, and wherein a number of uplink transmission occasions or slots for the first TPMI and/or SRI is aligned with a number of uplink transmission occasions or slots for which a same frequency resource is allocated for uplink transmission with repetition.

Example 38 may include the method of example 20-37 or some other example herein, further comprising determining the TPMI index and/or SRI index for each PUSCH transmission repetition based on one or more of the following parameters: a slot index or PUSCH transmission occasion, a number of repetitions for PUSCH transmission, a number of PUSCH transmissions in a same frequency allocation, or a total number of available values of TPMI index and/or SRI index.

Example 39 may include the method of example 38 or some other example herein, wherein TPMI or SRI index is determined based on:

$$n_{TPMI} = \mod(n_s^\mu, N_{TPMI})$$

where $n_s^\mu$ is the slot index, $N_{TPMI}$ is total number of TPMI values for PUSCH transmission with repetitions.

Example 40 may include the method of example 38 or some other example herein, wherein TPMI or SRI index is determined based on:

$$n_{TPMI} = \mod\left(\left\lfloor \frac{n_s^\mu}{D} \right\rfloor, N_{TPMI}\right)$$

where D is the number of PUSCH transmissions with same frequency allocation within repetition.

Example 41 may include the method of example 20-40 or some other example herein, further comprising applying transmit diversity for the transmission of the PUSCH repetition; wherein the transmit diversity includes a space-frequency block code (SFBC) or a space-time block code (STBC) based transmission scheme.

Example 42 may include the method of example 20-41 or some other example herein, further comprising applying multiple port transmission for transmission of the PUSCH repetition and/or other PUSCH repetitions for the same PUSCH.

Example 43 may include the method of example 42 or some other example herein, wherein PUSCH transmission on each antenna port (AP) is mapped onto different frequency resources for different APs.

Example 44 may include the method of example 42 or some other example herein, wherein for each AP used for the multiple port transmission, PUSCH transmission is mapped to consecutive physical resource blocks (PRB).

Example 45 may include the method of example 44 or some other example herein, wherein a distance between a starting PRB of the PUSCH transmission in frequency for two APs is predefined in the specification or configured by higher layers via dedicated radio resource control (RRC) signalling.

Example 46 may include the method of example 42 or some other example herein, wherein the starting PRB for PUSCH transmission for different APs is determined based on a bandwidth of an initial or active UL bandwidth part (BWP).

Example 47 may include the method of example 42 or some other example herein, wherein the multiple port transmission includes interleaved PUSCH transmission for different APs.

Example 48 may include the method of example 47 or some other example herein, wherein PUSCH transmission for different APs are mapped to different subcarriers, or physical resource blocks (PRB) in an interleaved manner.

Example 49 may include the method of example 20-48 or some other example herein, wherein the method is performed by a UE or a portion thereof.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for physical uplink shared channel (PUSCH) repetition in a fifth-generation (5G) new radio (NR) network, the apparatus comprising: processing circuitry; and memory, the processing circuitry configured to:
   decode a downlink control information (DCI) format received from a generation node B (gNB), the DCI format including a scheduling grant for a PUSCH transmission,
   wherein when the UE is configured for a codebook-based PUSCH transmission, the processing circuitry is to determine from the DCI format at least a first and a second transmit precoder matrix indicator (TPMI) for PUSCH repetition and a first and a second sounding reference signal (SRS) resource indicator (SRI) for the PUSCH repetition, and the processing circuitry is configured to:
   apply the first SRI and a precoder determined from the first TPMI to encode a PUSCH for a first PUSCH transmission occasion of the PUSCH repetition; and apply the second SRI and a precoder determined from the second TPMI to encode the PUSCH for a second PUSCH transmission occasion of the PUSCH repetition, and wherein for a non-codebook-based PUSCH transmission, the processing circuitry is to determine from the DCI format the first and second SRIs for the PUSCH repetition, each SRI corresponding to an SRS resource set, and the processing circuitry is configured to:

apply the first SRI to the PUSCH for the first PUSCH transmission occasion of the PUSCH repetition; and apply the second SRI to the PUSCH for the second PUSCH transmission occasion of the PUSCH repetition, wherein for the first PUSCH transmission occasion of the codebook-based PUSCH transmission, the first TPMI is applied to at least two repetitions of the PUSCH that are transmitted within a same first slot using a same first allocated frequency, and wherein for the second PUSCH transmission occasion of the codebook-based PUSCH transmission, the second TPMI is applied to at least two repetitions of the PUSCH that are transmitted within a same second slot using a same second allocated frequency, and wherein the memory is configured to store the DCI format.

2. The apparatus of claim 1, wherein the DCI format comprises one of DCI format 0_1 and DCI format 0_2.

3. The apparatus of claim 2, wherein for the codebook-based PUSCH transmission:

the DCI format includes the first TPMI and a number of multiple-input multiple-output (MIMO) transmission layers for the first PUSCH transmission occasion, and the second TPMI and a number of MIMO transmission layers for the second PUSCH transmission occasion; and the processing circuitry is to encode the PUSCH in accordance with the number of layers indicated for each of the first and the second PUSCH transmission occasion of the PUSCH repetition.

4. The apparatus of claim 2, wherein for single-DCI based multi-transmission-reception point (M-TRP) codebook-based PUSCH repetition, when two TPMIs are indicated, a same number of MIMO transmission layers are applied for both the PUSCH transmission in first PUSCH transmission occasion for the first TPMI and the PUSCH transmission in the second PUSCH transmission occasion for the second TPMI.

5. The apparatus of claim 1, wherein for the non-codebook-based PUSCH transmission the DCI format includes two SRI fields corresponding to one or two SRS resource sets for the non-codebook-based PUSCH transmission with repetition.

6. The apparatus of claim 4, wherein each TPMI index corresponds to a different precoder for application of different precoding matrixes for different transmission occasions of the PUSCH repetition.

7. The apparatus of claim 6, wherein the processing circuitry is to encode each PUSCH transmission of the PUSCH repetition for a multi-layer transmission in accordance with the number of MIMO transmission layers using multiple antenna ports.

8. The apparatus of claim 4, wherein for the single-DCI based multi-transmission-reception point (M-TRP) codebook-based PUSCH repetition, the processing circuitry is configured to:

determine a first transmit beam direction from the first SRI to apply to the first PUSCH transmission occasion of the PUSCH repetition; and determine a second transmit beam direction from the second SRI to apply to the second PUSCH transmission occasion of the PUSCH repetition.

9. The apparatus of claim 1, wherein the processing circuitry comprises a baseband processor.

10. A non-transitory computer-readable storage medium that stores instructions for execution by processing circuitry a user equipment (UE) configured for physical uplink shared channel (PUSCH) repetition in a fifth-generation (5G) new radio (NR) network, the processing circuitry is configured to:

decode a downlink control information (DCI) format received from a generation node B (gNB), the DCI format including a scheduling grant for a PUSCH transmission, wherein when the UE is configured for a codebook-based PUSCH transmission, the processing circuitry is to determine from the DCI format at least a first and a second transmit precoder matrix indicator (TPMI) for PUSCH repetition and a first and a second sounding reference signal (SRS) resource indicator (SRI) for the PUSCH repetition, and the processing circuitry is configured to:

apply the first SRI and a precoder determined from the first TPMI to encode a PUSCH for a first PUSCH transmission occasion of the PUSCH repetition; and apply the second SRI and a precoder determined from the second TPMI to encode the PUSCH for a second PUSCH transmission occasion of the PUSCH repetition, and wherein for a non-codebook-based PUSCH transmission, the processing circuitry is to determine from the DCI format the first and second SRIs for the PUSCH repetition, each SRI corresponding to an SRS resource set, and the processing circuitry is configured to:

apply the first SRI to the PUSCH for the first PUSCH transmission occasion of the PUSCH repetition; and apply the second SRI to the PUSCH for the second PUSCH transmission occasion of the PUSCH repetition, wherein for the first PUSCH transmission occasion of the codebook-based PUSCH transmission, the first TPMI is applied to at least two repetitions of the PUSCH that are transmitted within a same first slot using a same first allocated frequency, and wherein for the second PUSCH transmission occasion of the codebook-based PUSCH transmission, the second TPMI is applied to at least two repetitions of the PUSCH that are transmitted within a same second slot using a same second allocated frequency, wherein the memory is configured to store the DCI format.

11. The non-transitory computer-readable storage medium of claim 10, wherein the DCI format comprises one of DCI format 0_1 and DCI format 0_2.

12. The non-transitory computer-readable storage medium of claim 11, wherein for the codebook-based PUSCH transmission:

the DCI format includes the first TPMI and a number of multiple-input multiple-output (MIMO) transmission layers for the first PUSCH transmission occasion, and the second TPMI and a number of MIMO transmission layers for the second PUSCH transmission occasion; and the processing circuitry is to encode the PUSCH in accordance with the number of layers indicated for each of the first and the second PUSCH transmission occasion of the PUSCH repetition.

13. The non-transitory computer-readable storage medium of claim 11, wherein for single-DCI based multi-transmission-reception point (M-TRP) codebook-based PUSCH repetition, when two TPMIs are indicated, a same number of MIMO transmission layers are applied for both the PUSCH transmission in first PUSCH transmission occasion for the first TPMI and the PUSCH transmission in the second PUSCH transmission occasion for the second TPMI.

14. The non-transitory computer-readable storage medium of claim 10, wherein for the non-codebook-based PUSCH transmission the DCI format includes two SRI fields corresponding to one or two SRS resource sets to employ SRI cycling for the non-codebook-based PUSCH transmission with repetition.

15. The non-transitory computer-readable storage medium of claim 13, wherein each TPMI index corresponds to a different precoder for application of different precoding matrixes for different transmission occasions of the PUSCH repetition.

16. The non-transitory computer-readable storage medium of claim 15, wherein the processing circuitry is to encode each PUSCH transmission of the PUSCH repetition for a multi-layer transmission in accordance with the number of MIMO transmission layers using multiple antenna ports.

* * * * *